3,178,400
PROCESS FOR THE COPOLYMERIZATION OF OLEFINS

Mario Ragazzini and Roberto Magri, Milan, Italy, assignors to Montecatini Società Generale per l'Industria Mineraria e Chimica, Milan, Italy
No Drawing. Filed Dec. 6, 1960, Ser. No. 74,015
Claims priority, application Italy, Dec. 9, 1959, 20,559/59
9 Claims. (Cl. 260—88.2)

The present invention relates to a process for the copolymerization of at least two olefins in the presence of catalysts comprising (a) vanadium tetrachloride and (b) mixtures of a dialkyl aluminum monohydride and a trialkyl aluminum compound.

It is well known in the art that polyolefins polymerize in the presence of catalysts containing vanadium tetrachloride and trialkyl aluminum compounds.

The copolymers thus obtained, however, have a very high molecular weight. This high molecular weight represents a distinct disadvantage in regard to these copolymers since it renders more difficult the various operations required in working the copolymers.

One of the objects of the present invention is therefore to produce olefin copolymers which possess lower molecular weights and therefore are capable of being worked with greater ease.

Applicant has now surprisingly found that when the copolymerization is carried out in the presence of catalysts in which the trialkyl aluminum compound is partially replaced by a dialkyl aluminum monohydride, a decrease in molecular weight is obtained.

Another object of the present invention is therefore the carrying out of a process for the copolymerization of at least two olefins in contact with polymerization catalysts consisting essentially of (a) canadium tetrachloride and (b) mixtures of organometallic compounds, soluble in the reaction medium consisting essentially of $AlHR_2$ compounds with compounds of the formula $AlR_3$, in which R in both the formulas is an alkyl radical having from 1 to 5 carbon atoms.

All olefins may be copolymerized according to the process of this invention the preferred among them being ethylene, propylene and butene-1.

The copolymers thus obtained as a result of this invention have especially desirable characteristics in that although they possess a lower molecular weight than the copolymers obtained using conventional catalysts containing vanadium tetrachloride and aluminum trialkyl compounds, they still retain desirable mechanical properties similar to these higher molecular weight copolymers.

The copolymers obtained by the process of the present invention also appear to be completely homogeneous, since in their spectra the characteristic bands of the single crystalline polyolefins are absent and the spectrum presents characteristics exactly similar to those of the copolymers obtained by copolymerization in the presence of $Al(i-C_4H_9)_3 + VCl_4$.

The copolymers obtained by the process of the present invention may be used with success as elastomers.

The copolymerization process of the present invention may be desirably carried out in a temperature range between $-60°$ C. and $+40°$ C. The copolymerization is preferably carried out at a temperature lower than $+20°$ C. When ethylene is used as one of the olefins, if the temperature is increased the dialkyl aluminum monohydride begins to absorb ethylene thus being transformed into a trialkyl aluminum compound, which fact results in an increase in the molecular weight of the copolymer.

The copolymerization is therefore carried out under such conditions so that this absorption takes place very slowly in order not to influence significantly the action of the dialkyl aluminum monohydride.

The pressure under which the copolymerization of the present invention is carried out, can vary within wide limits which are not only a function of the working temperature, but probably depend on the composition of the mixture of monomers selected in order to obtain a given polymer.

When ethylene and propylene are copolymerized in equimolar proportions, the pressure is generally kept below 20 atm.

The following example illustrates the present invention without limiting its scope.

EXAMPLE

In a 7.2 liter autoclave a series of copolymerizations are carried out at a temperature of $-10°$ C., with a reaction phase consisting of 97 mole percent propylene and 3 mole percent ethylene, which yields an ethylene-propylene molar composition of 1:1.

In accordance with the above procedures a series of copolymerizations were carried out in the presence of $Al(i-C_4H_9)_3$ and $VCl_4$ then gradually substituting increasingly larger amounts of $AlH(i-C_4H_9)_2$. The data obtained is reported in the table.

*Table*
[Runs carried out with $Al(i-C_4H_9)_3 + AlH(i-C_4H_9)_2$ and $VCl_4$]

| Run No. | VCl conc., g./l. | Mols $\dfrac{[AlH(i-C_4H_9)_2 + Al(i-C_4H_9)_3]}{\text{Mols } VCl_4}$ | Mols $\dfrac{AlH(i-C_4H_9)_2 \times 100}{\text{Mols }[AlH(i-C_4H_9)_2 + Al(i-C_4H_9)_3]}$ | Copolymer, g. $\dfrac{}{VCl_4, g.}$ | [η] |
|---|---|---|---|---|---|
| 1 | 0.0190 | 4 | 0 | 2,000 | 7.02 |
| 2 | 0.0190 | 4 | 20 | 1,800 | 5.03 |
| 3 | 0.0190 | 4 | 50 | 1,600 | 4.01 |
| 4 | 0.0190 | 4 | 100 | 1,500 | 3.85 |

η=intrinsic viscosity (determined at 135° C. in tetrahydronaphthalene).

The mechanical characteristics determined according to ASTM D412–51T of vulcanized compounds prepared from copolymers having an intrinsic viscosity [η] of 4.5–5.5 (vulcanization mix: carbon black 50 p.p.c. (parts per hundred), sulphur 0.25 p.p.c., cumyl peroxide 1.5 p.p.c.; temperature 155° C., time=20 minutes) obtained according to the example, are as follows:

(1) Tensile strength _____ kg./cm.$^2$ __ 220–230
(2) Modulus at 300% _____ kg./cm.$^2$ __ 75–85
(3) Elongation at break _____ percent __ 500–600
(4) Residual elongation (elongation at 200% for 1 hour, reading after 1 minute)
    percent __ 7.5–9.5
(5) Tear strength _____ kg./cm.$^2$ __ 35–40

As is seen from the above data the copolymers of this invention not only possess desirably low molecular weights as indicated by their intrinsic viscosities [η], thus making them easier to work, but also retain good mechanical properties.

Having thus described the invention, what is desired to secure and claim by Letters Patent is:

1. A process for copolymerizing at least two alpha monoolefins which comprises polymerizing said olefins at a temperature ranging from about a $-60°$ C. to a $+40°$ C. in the presence of an effective amount of a catalyst consisting essentially of (a) vanadium tetrachloride and (b) a mixture of organo-metallic compounds consisting of $AlR_2H$ and $AlR_3$, wherein R is an alkyl group of 1 to 4 carbon atoms; said mixture consisting of about 20–50 mols percent of the $AlR_2H$ and 80–50 mols percent of the $AlR_3$ and the molar ratio of the organo-metallic compounds to the vanadium tetrachloride being approximately 4.

2. The process of claim 1, further characterized in that the temperature is below $+10°$ C.

3. The process of claim 1, further characterized in that the temperature is below $-10°$ C.

4. The process of claim 1, further characterized in that at least one of the olefins is ethylene.

5. The process or claim 1, further characterized in that at least one of the olefins is propylene.

6. The process of claim 1, further characterized in that the olefins are a mixture of ethylene and butene-1.

7. The process of claim 1, further characterized in that the copolymerization is carried out under a pressure below 20 atmospheres.

8. The process of claim 1, further characterized in that the alkyl group of the organometallic compounds is an isobutyl radical.

9. The process of claim 1, further characterized in that the alkyl group of the organometallic compounds is an ethyl radical.

References Cited by the Examiner
UNITED STATES PATENTS

| 2,954,367 | 9/60 | Vandenberg | 260—88.2 |
| 2,962,451 | 11/60 | Schreyer | 260—94.9 |

FOREIGN PATENTS

| 218,210 | 11/58 | Australia. |
| 543,292 | 6/56 | Belgium. |

OTHER REFERENCES

Natta: J. Pol. Sci., vol. 34, pp. 91 (1959).
"Linear and Stereoregular Additive Polymers," by Gaylord et al., Interscience Publishers (1959), pages 111–113, 130, and 131.

JOSEPH L. SCHOFER, *Primary Examiner.*

M. LIEBMAN, *Examiner.*